United States Patent [19]

Holt

[11] Patent Number: 5,922,057
[45] Date of Patent: Jul. 13, 1999

[54] METHOD FOR MULTIPROCESSOR SYSTEM OF CONTROLLING A DYNAMICALLY EXPANDABLE SHARED QUEUE IN WHICH OWNERSHIP OF A QUEUE ENTRY BY A PROCESSOR IS INDICATED BY A SEMAPHORE

[75] Inventor: Keith W. Holt, Wichita, Kans.

[73] Assignee: LSI Logic Corporation, Milpitas, Calif.

[21] Appl. No.: 08/781,336

[22] Filed: Jan. 10, 1997

[51] Int. Cl.$^6$ .................................................. G06F 13/00
[52] U.S. Cl. ................................. 710/52; 710/55; 710/56; 711/147; 711/154; 709/234
[58] Field of Search ........................... 395/872, 200.64, 395/875, 876; 711/147, 148, 154, 155; 710/52, 55, 56; 709/234

[56] References Cited

U.S. PATENT DOCUMENTS

| | | | |
|---|---|---|---|
| 4,038,642 | 7/1977 | Bouknecht et al. | 364/900 |
| 4,429,360 | 1/1984 | Hoffman et al. | 364/200 |
| 4,663,706 | 5/1987 | Allen et al. | 364/200 |
| 4,807,111 | 2/1989 | Cohen et al. | 364/200 |
| 4,821,170 | 4/1989 | Bernick et al. | 364/200 |
| 4,945,548 | 7/1990 | Iannarone et al. | 375/4 |
| 5,003,464 | 3/1991 | Ely et al. | 364/200 |
| 5,023,776 | 6/1991 | Gregor | 364/200 |
| 5,224,215 | 6/1993 | Disbrow | 395/250 |
| 5,239,634 | 8/1993 | Buch et al. | 395/400 |
| 5,274,823 | 12/1993 | Brenner et al. | 395/725 |
| 5,313,587 | 5/1994 | Patel et al. | 395/275 |
| 5,313,638 | 5/1994 | Ogle et al. | 395/725 |
| 5,315,707 | 5/1994 | Seaman et al. | 395/250 |
| 5,319,778 | 6/1994 | Catino | 395/600 |
| 5,325,526 | 6/1994 | Cameron et al. | 395/650 |
| 5,341,491 | 8/1994 | Ramanujan | 395/425 |
| 5,363,497 | 11/1994 | Baker et al. | 395/425 |
| 5,381,413 | 1/1995 | Tobagi et al. | 370/85.6 |
| 5,386,514 | 1/1995 | Lary et al. | 395/250 |
| 5,388,215 | 2/1995 | Baker et al. | 395/200 |
| 5,394,547 | 2/1995 | Correnti et al. | 395/650 |
| 5,404,521 | 4/1995 | Murray | 395/650 |
| 5,442,730 | 8/1995 | Bigus | 395/22 |
| 5,519,883 | 5/1996 | White et al. | 395/840 |
| 5,539,893 | 7/1996 | Thompson et al. | 395/449 |
| 5,541,912 | 7/1996 | Choudhury et al. | 370/17 |
| 5,546,391 | 8/1996 | Hochschild et al. | 370/60 |
| 5,551,001 | 8/1996 | Cohen et al. | 395/449 |
| 5,555,396 | 9/1996 | Alferness et al. | 395/474 |
| 5,555,405 | 9/1996 | Griesmer et al. | 395/600 |
| 5,560,034 | 9/1996 | Goldstein | 395/800 |
| 5,579,504 | 11/1996 | Callander et al. | 395/471 |
| 5,581,734 | 12/1996 | DiBrino et al. | 395/496 |
| 5,604,866 | 2/1997 | Kolb et al. | 395/200.13 |
| 5,623,449 | 4/1997 | Fischer et al. | 315/200 |
| 5,740,467 | 4/1998 | Chmielecki, Jr. et al. | 395/876 |
| 5,774,745 | 6/1998 | Ecclesine | 395/872 |

Primary Examiner—Thomas C. Lee
Assistant Examiner—Albert Wang
Attorney, Agent, or Firm—Wayne P. Bailey; Duke W. Yee

[57] ABSTRACT

In a multiprocessor data processing system including at least one main processor and one sub-processor utilizing a shared queue, queue integrity is maintained by associating a semaphore with each queue entry to indicate ownership of that queue entry. Ownership of a queue entry is checked by a processor attempting to post to the queue entry. Upon determining that the queue entry is available to the processor, the queue entry is loaded by an atomic write operation, ownership of the queue entry transferred to another processor, and the other processor may be alerted of the post to the queue. The other processor maintains ownership of the queue entry until the other processor has read and saved the data from the queue entry. Items may thus be posted to the queue and cleared from the queue by a processor independent of the state of the other processor. No locking mechanism or atomic read-modify-write capability is required to enforce mutual exclusion between the main processor and the sub-processor to maintain queue integrity.

31 Claims, 7 Drawing Sheets

METHOD FOR MULTIPROCESSOR SYSTEM OF CONTROLLING A DYNAMICALLY EXPANDABLE SHARED QUEUE IN WHICH OWNERSHIP OF A QUEUE ENTRY BY A PROCESSOR IS INDICATED BY A SEMAPHORE

BACKGROUND OF THE INVENTION

1. Technical Field

The present invention relates generally to the processing of data and in particular to a multi-processor data processing system. Still more particularly, the present invention relates to a method and apparatus for handling queues in a multi-processor data processing system.

2. Description of the Related Art

Multiprocessor data processing systems contain multiple processors that each can operate on its own data. Typically, these processors operate independently of each other, normally on autonomous tasks or significant portions of large tasks. Multiprocessor systems typically fall into two categories: shared-memory systems and distributed-memory systems. In shared memory systems, the processors communicate by reading and writing data to a shared memory location in a common address space. Additionally, shared memory usually implies a shared bus, but such is not necessarily the case. Within the shared memory, communications between various processors are usually performed through queues. Typically, a large number of queues are commonly used by the data processing system to control reusable hardware and software resources within the data processing system, including the queues, which are themselves system resources.

Queues are data structures used to organize sets of data blocks in memory by means of pointers associated with each data block in a queue. Each queue typically includes a number of entries, also called "elements," with each entry or element comprising a unit of the queue. Queues may be classified into several general types according to the relative locations of the elements in the queue. Contiguous queues have elements physically located next to each other while linear chained queues are queues with elements physically disbursed anywhere within main or virtual storage.

The data blocks within queues, whether located physically next to each other or disbursed within main or virtual storage, are associated with each other through linked lists. A "doubly linked" list has two pointers in each element, pointing to the next and previous elements in the list. In the case of "singly linked" queues, the pointers reference the addresses of successive data blocks in the queue. A singly linked queue is a queue in which each element includes a pointer to its successor in the queue.

Data processing systems with multiple processing units coupled to a memory system often perform queued operations to organize related blocks of stored data. In particular, multiprocessor designs that consist of one or more main processors and an input/output (I/O) sub-processor commonly utilize shared queues in system memory to allow each main processor to communicate with the I/O sub-processor. An output queue, also called a "start" queue, is employed to send I/O requests from the main processor to the sub-processor. Similarly, an input queue, also called a "completion" queue, is employed to return completion information from the sub-processor to the main processor. In both cases, one processor adds an item to the queue by a "post" operation while the other processor removes an item from the queue by a "clear" operation. Thus, both the main processor and the sub-processor must be capable of performing read-modify-write operations on the queues.

In data processing systems having multiple central processors, each simultaneously and asynchronously executing separate instruction streams relative to a shared memory system, queue integrity is a serious concern. It is undesirable for a processor to take action based on a change in the queue by another processor which is not yet complete. This could happen, for example, if one processor attempts to change a queue element while another processor is changing that element. In open platform systems, in particular, read-modify-write operations are not guaranteed to be atomic, which means that it is possible for one processor to alter shared memory during a modify phase in another processor.

To maintain queue integrity, queues in shared memory systems have a mutual exclusion requirement during certain read-modify-write operations. Existing designs that use queues in shared memory rely on software locking mechanisms to enforce this mutual exclusion. Because such locking mechanisms degrade I/O performance by introducing latency (delay) in both the main processor and I/O sub-processor operations, it is desirable to eliminate the lock requirement. The latency introduced by locking mechanisms becomes especially important if the I/O sub-processor has limited processing capability relative to the main processor. Whenever a lock occurs, execution in one processor stalls until the other processor releases the lock. Thus, in cases where the capability of the sub-processor is limited, the performance degradation of the main processor is disproportionate to that of the sub-processor.

It would be advantageous to increase the total number of I/O operations completed during a given unit of time by a typical data processing system. The mechanism employed should be applicable to any system using one or more main processors handling upper level operating system operations and one or more independent I/O sub-processors handling lower level transport I/O protocol(s).

SUMMARY OF THE INVENTION

In a multiprocessor data processing system including at least one main processor and one sub-processor utilizing a shared queue, queue integrity is maintained by associating a semaphore with each queue entry to indicate ownership of that queue entry. Ownership of a queue entry is checked by a processor attempting to post to the queue entry. Upon determining that the queue entry is available to the processor, the queue entry is loaded by an atomic write operation, ownership of the queue entry transferred to another processor, and the other processor may be alerted of the post to the queue. The other processor maintains ownership of the queue entry until the other processor has read and saved the data from the queue entry. Items may thus be posted to the queue and cleared from the queue by a processor independent of the state of the other processor. No locking mechanism or atomic read-modify-write capability is required to enforce mutual exclusion and maintain queue integrity.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
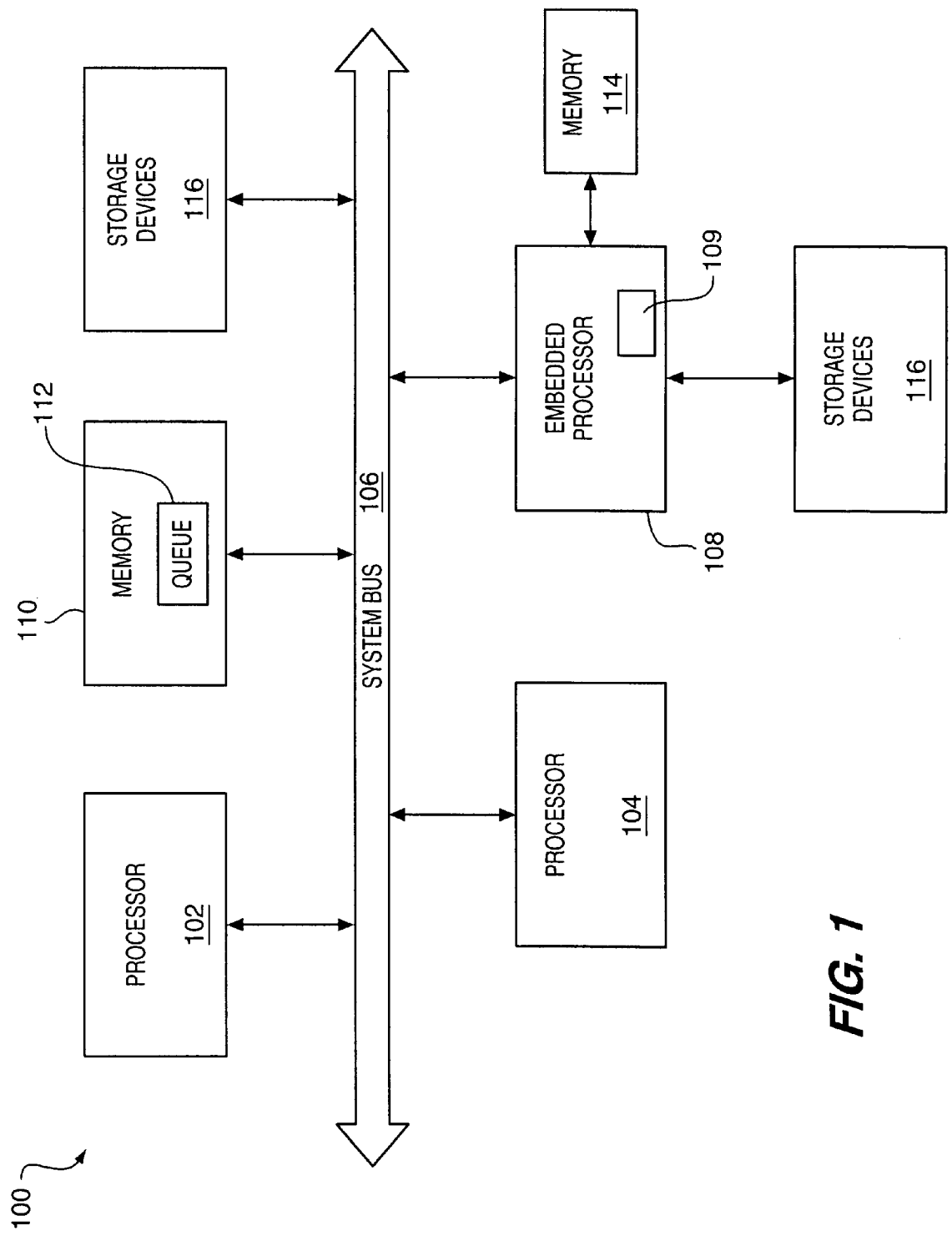
FIG. 1 depicts a block diagram of a data processing system in which the present invention may be implemented.

With reference now to the figures, and in particular with reference to FIG. 1, a block diagram of a data processing system in which the present invention may be implemented may be implemented is depicted. Data processing system 100 includes multiple main processors or central processing units, processors 102 and 104, which are connected to system bus 106. System bus 106 may be implemented using various data processing system architectures, such as the peripheral component interface (PCI) architecture. Processors 102 and 104 may be implemented using various microprocessors, such as for example, Intel Pentium, Intel Pentium Pro, Digital Alpha, or Motorola PowerPC. Data processing system 100 also includes an embedded processor or sub-processor 108, which is typically found in an adapter, such as a small computer system interface (SCSI) adapter. Embedded processor 108 may be located on an adapter providing a connection to a hard drive, an array of hard drives such as a redundant array of inexpensive disks (RAID), and/or a CD-ROM.

Instructions for processes and algorithms executed by processors 102 and 104 may be found in memory 110 which may include both volatile and nonvolatile memory devices, such as random access memory (RAM) and read only memory (ROM). Embedded processor 108 also may execute instructions for its processes located in memory 110, which is a shared memory that is used to provide communication between processor 102, processor 104, and embedded processor 108.

Alternatively, embedded processor 108 may execute instructions located in a memory 114 associated with embedded processor 108. Memory 114, like memory 110, may include both volatile and non-volatile memory devices, such as RAM and ROM. Unlike memory 110, memory 114 is not a shared memory. The queues manipulated by the various processors in data processing 100 are located in queue block 112 within memory 110.

Communication between processors is facilitated through queues found within queue block 112 in memory 110. An output or start queue (not shown) is used to send requests such as I/O requests from processors 102 and 104 to embedded processor 108. Similarly, an input or completion queue (not shown) is used to return completion information from embedded processor 108 to processors 102 or 104. Each embedded processor has its own associated start and completion queues within queue block 112.

Storage devices 116 are shared storage devices which may be connected to system bus 106 and represent non-volatile storage in the depicted example. This is a secondary type of storage which may include, for example, hard disks, CD-ROMs, and/or tape drives and their equivalents. If embedded processor or sub-processor 108 is located on a SCSI adapter, storage devices 116 may be connected to system bus 106 through the adpater containing embedded processor 108.

Although in the depicted example in FIG. 1, data processing system 100 contains two main processors, processors 102 and 104, and a single embedded processor 108, other numbers and types of processors may be employed in different combinations according to the present invention. For example, the present invention may be implemented in a data processing system containing a single main processor and a single embedded processor. In other words, the present invention may be applied to data processing systems containing at least two processors that communicate through a shared memory. Additionally, although the start and completion queues for each embedded processor are depicted as all being contained within the queue block 112 of shared memory 110, other arrangements are possible, including implementing both the start and completion queues for a given embedded processor in memory associated with that embedded processor but accessible to at least one main processor. Such modifications, equivalents, and various alternative forms are understood to fall within the spirit and scope of the invention.

Figure 2:
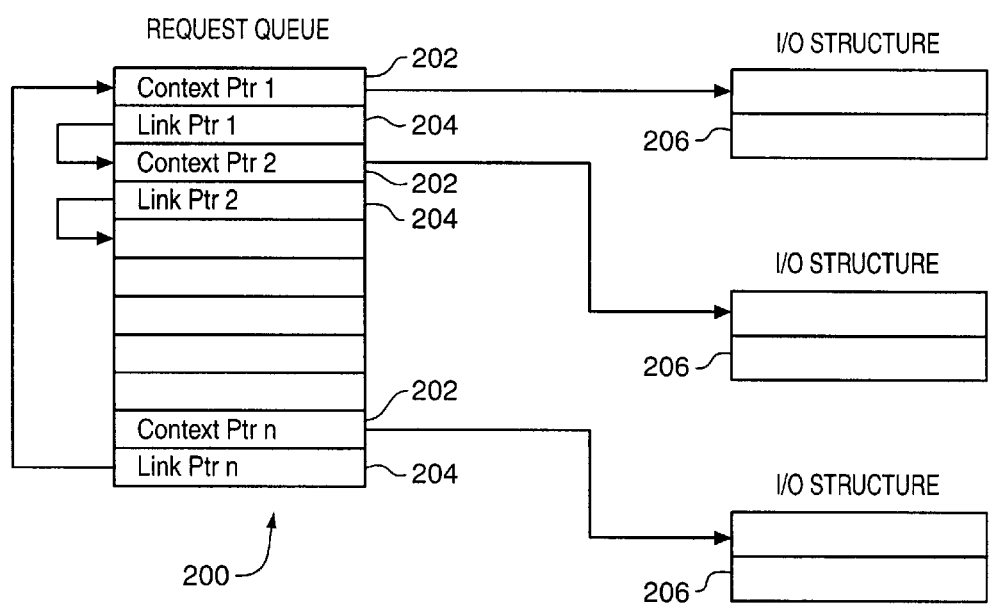
FIG. 2 is a block diagram of a queue according to the present invention.

With reference now to FIG. 2, a block diagram of a queue 200 that may be found within queue block 112 in FIG. 1 is depicted according to the present invention. Queue 200 may be either a start or a completion queue associated with a particular embedded processor, used to convey I/O requests and completion information between a main processor and a sub-processor. In the depicted example, queue 200 is a circular queue although other types of queues may be implemented according to the present invention. Queue 200 is a data structure containing a list of elements, also called "entries", stored in memory within queue block 112. Entries are appended to the "last" position in the list and retrieved from the "first" position in the list in queue 200. In other words, the next item to be retrieved is the item that has been in the list for the longest time. Queue 200 is thus a first-in, first-out (FIFO) queue.

Queue 200 is constructed using linked lists, which allows a main processor to dynamically increase or decrease the number of entries in the queue in response to the workload. In the example described, queue entries are physically contiguous and linked together as a circular queue which is constructed statically during system initialization.

In the depicted example, queue 200 is a singly linked list in which each data element or entry includes two portions: context pointer 202 and link pointer 204. Each link pointer 204 is a physical pointer to the next entry in the queue. Link pointer 204 in the last element, entry N, points back to the first entry, entry 1 to form a circular queue. A read pointer (not shown) is employed to point to the entry (in the "first" position) currently being read from queue 200 while write pointer (not shown) points to the entry (in the "last" position) in which data is being written into. The read pointer always lags behind the write pointer, with both pointers traversing the elements in a circular fashion.

In an output queue, each context pointer 202 includes a physical pointer field and a semaphore field. (As used herein, "semaphore" refers to a flag, variable, or any other data structure which may be employed to indicate ownership of a queue entry.) The physical pointer field points to an I/O data structure 206, which contains control and data elements for the sub-processor. The semaphore field serves to establish ownership of the queue entry and indicates the state of the entry. In an input queue, each context pointer 202 acts as both the semaphore field and a free-form value obtained by the sub-processor from an I/O data structure 206. Typically, this is a virtual pointer which will be used by the main processor. In both input and output queues, the value of zero for context pointer 202 is reserved to indicate that the queue entry is empty. For the output queue, any context pointer for which the semaphore field is zero is reserved; for the input queue, for which the entire context pointer acts as the semaphore, only zeroes in the entire context pointer is reserved.

Context pointer 202 is employed to obviate the locking requirements by establishing ownership of queue elements. Ownership is passed from one processor to another via an atomic write operation. For optimal performance, data processing system 100 in FIG. 1 requires hardware allowing processors 102 and 104 and embedded processor 108 to signal each other that items have been placed in the queues. In the depicted example, embedded processor 108 includes a hardware register 109 which may be written to by processors 102 and 104 indicating that an item has been placed in the start queue. Embedded processor 108 must also be able to signal processors 102 and 104 via an interrupt that an item has been placed in the completion queue. The necessity for register 109 and the interrupt capability may be avoided, however, by having one or both of the main processor (processor 102 or 104) and the sub-processor (embedded processor 108) poll their respective queues for new items.

Referring again to FIG. 2, from the perspective of a given sub-processor utilizing a start queue or a completion queue, there appears to be only one main processor. Similarly each sub-processor has its own associated start and completion queues. Thus the operation of the invention may be described as though there were only a single main processor and a single sub-processor.

Context pointer 202 insures queue integrity when queue 200 is a start queue. When the main processor needs to place an item in the start queue, it ensures that the next entry pointed to by the write pointer is available. An entry is "empty" if the semaphore field of context pointer 202 is clear, indicating that the queue entry is owned by the main processor. For dynamically linked lists, this check is not required since queue 200 may be expanded in size to accommodate the new entry from the main processor.

When the main processor determines that the next queue entry is available, it then writes context pointer 202 to the queue entry and signals the sub-processor that an item has been posted to queue 200. At this point, the entire queue entry (context pointer 202 plus link pointer 204) is owned by the sub-processor. When the sub-processor has read and saved both pointers, it writes to the queue to clear the semaphore field in context pointer 202. This returns control of the queue entry to the main processor. When the sub-processor has completed the task and is ready for the next task, it checks the next queue entry (pointed to by the read pointer) to see if it has been loaded. If the next queue entry is empty, the sub-processor waits for the next signal from the main processor that a queue entry has been loaded. In this manner, integrity is maintained while the start queue is serviced without the locking mechanisms required in existing designs.

Context pointer 202 similarly insures queue integrity when queue 200 is a completion queue. When the sub-processor needs to place an item in the completion queue, it ensures that the next entry is available by determining if the semaphore field of context pointer 202 is zero, indicating that the next queue entry is owned by the sub-processor. For the output queue, only the semaphore field of the context pointer need be zero to indicate that the queue entry is empty. The semaphore field is preferably a three bit field including a function code. For the input queue, the entire context pointer acts as a semaphore, indicating that the queue entry is empty if the entire context pointer is zero.

The sub-processor reads link pointer 204 to the next queue entry while it still has ownership of the entry. The sub-processor then writes context pointer 202 to the queue and generates an interrupt to signal the main processor that an item has been added to queue 200. At this point, ownership of queue entry lies with the main processor. The main processor reads context pointer 202 from the queue entry, clears the semaphore field of context pointer 202, and clears the interrupt. The main processor may process more than one queue entry with one call to the interrupt service routine. After clearing the interrupt, the main processor checks the next queue entry to determine if it was loaded before the interrupt was cleared. In this fashion, the completion queue may be serviced without the locking mechanisms required in existing designs.

Because each queue is uniquely associated with only one sub-processor, ownership of a queue entry lies either with the sub-processor or with a main processor. This allows a main processor to post items to a queue asynchronous to operations in the sub-processor. Similarly, the sub-processor can post items to a queue asynchronous to operations in a main processor. Between main processors, queue integrity must still be maintained using techniques known in the art.

Figure 3A:
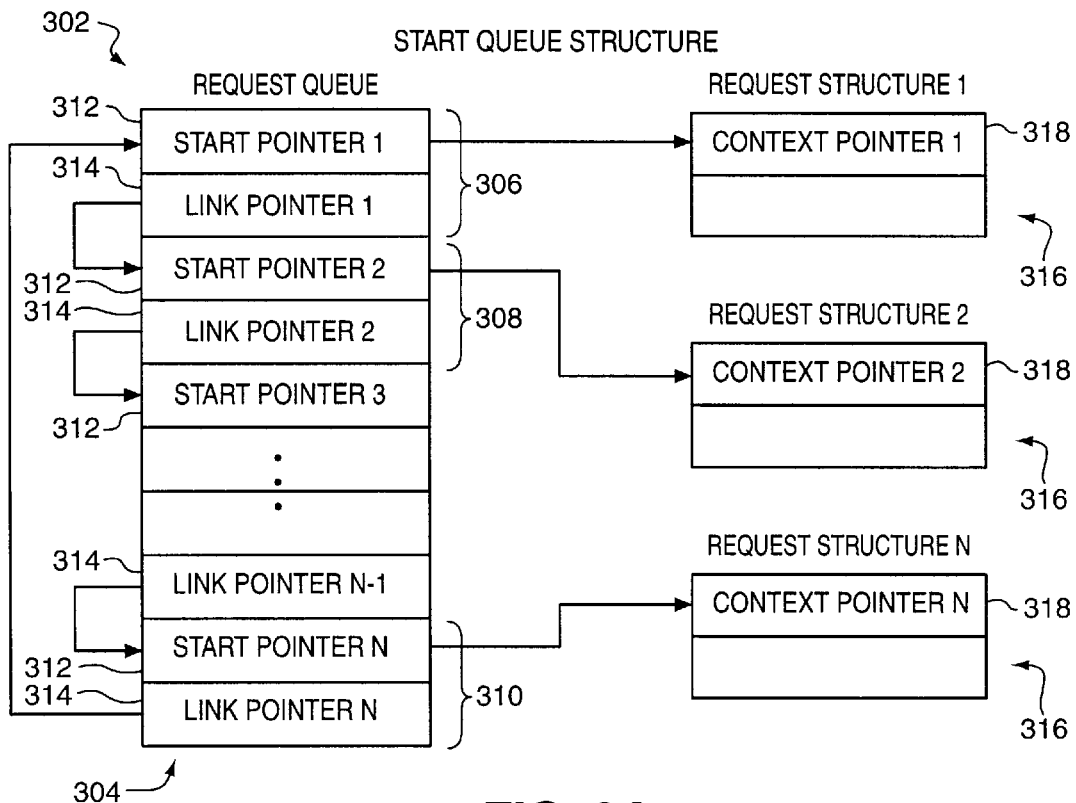
FIGS. 3A and 3B depict block diagrams of alternative start and completion queue structures according to the present invention.
Figure 3B:
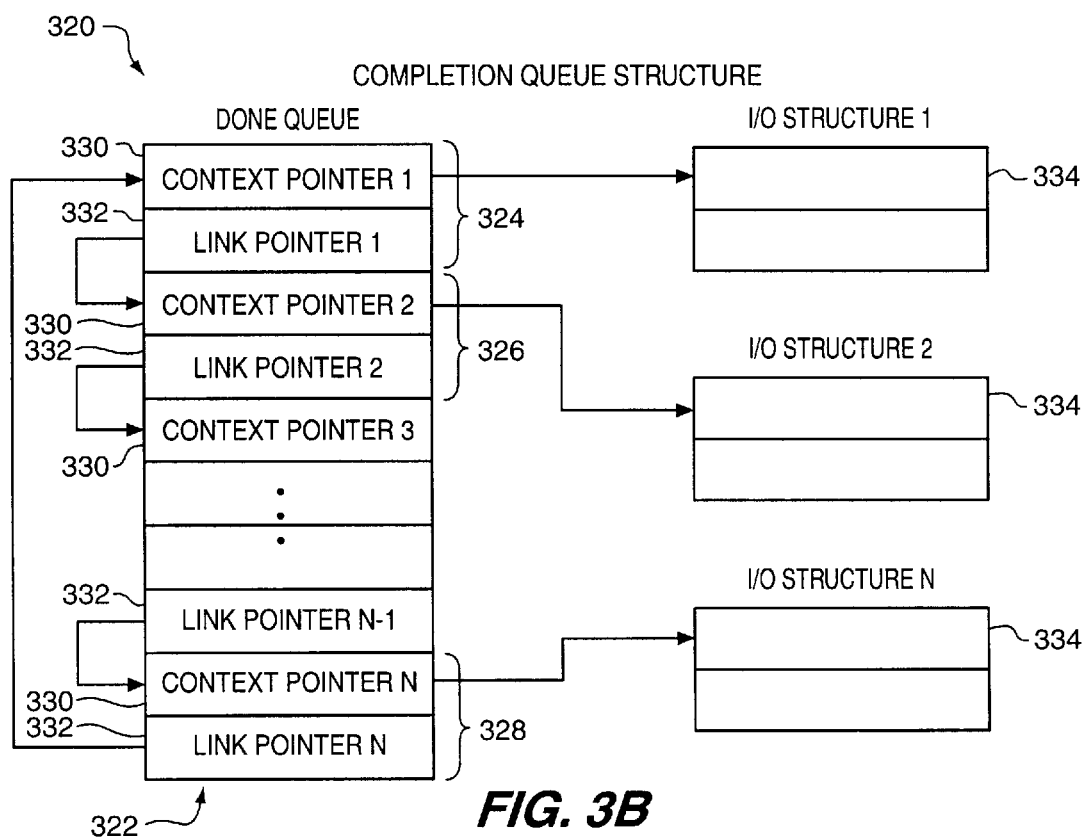

With reference now to FIGS. 3A and 3B, block diagrams of alternative start and completion queue structures according to the present invention are depicted. Start queue structure 302 includes a request queue 304 includes a plurality of N entries 306, 308, . . . , 310. Each entry comprises start pointer 312 and link pointer 314. Each link pointer 314 points to the start pointer 312 of the next entry. The last link pointer 314, the link pointer for entry N 310, points to the start pointer 312 for the first entry 306, forming a circular queue. Request queue 304 may be dynamically expanded by changing link pointer 314 of entry N to point to the start pointer of a new entry N+1 (not shown), which has a link pointer pointing to start pointer 312 of first entry 306.

Each start pointer 312 in request queue 304 includes a physical pointer field and a semaphore field. The physical pointer field points to a request structure 316, which contains control and data elements for the sub-processor. Each request structure 316 includes a context pointer 318 which will be returned by the sub-processor to the main processor in the completion queue. Combining the pointer and semaphore fields in the start pointer allows the sub-processor to access both elements with a single read. In addition, this reduces memory requirements. The drawback of combining the pointer and semaphore in the start pointer is that it forces alignment requirements on the request structure.

Completion queue structure 320 includes done queue 322 comprising a plurality of entries 324, 326, . . . , 328. Each entry contains a context pointer 330 and a link pointer 332. Similar to request queue 302, each link pointer 332 in done queue 322 points to the context pointer 330 of the next entry, with the link pointer 332 for entry N 328 pointing to the start pointer 330 for the first entry 324 to form a circular queue. Each context pointer 330 of done queue 322 points to an I/O structure 334 containing completion information.

Figure 4:
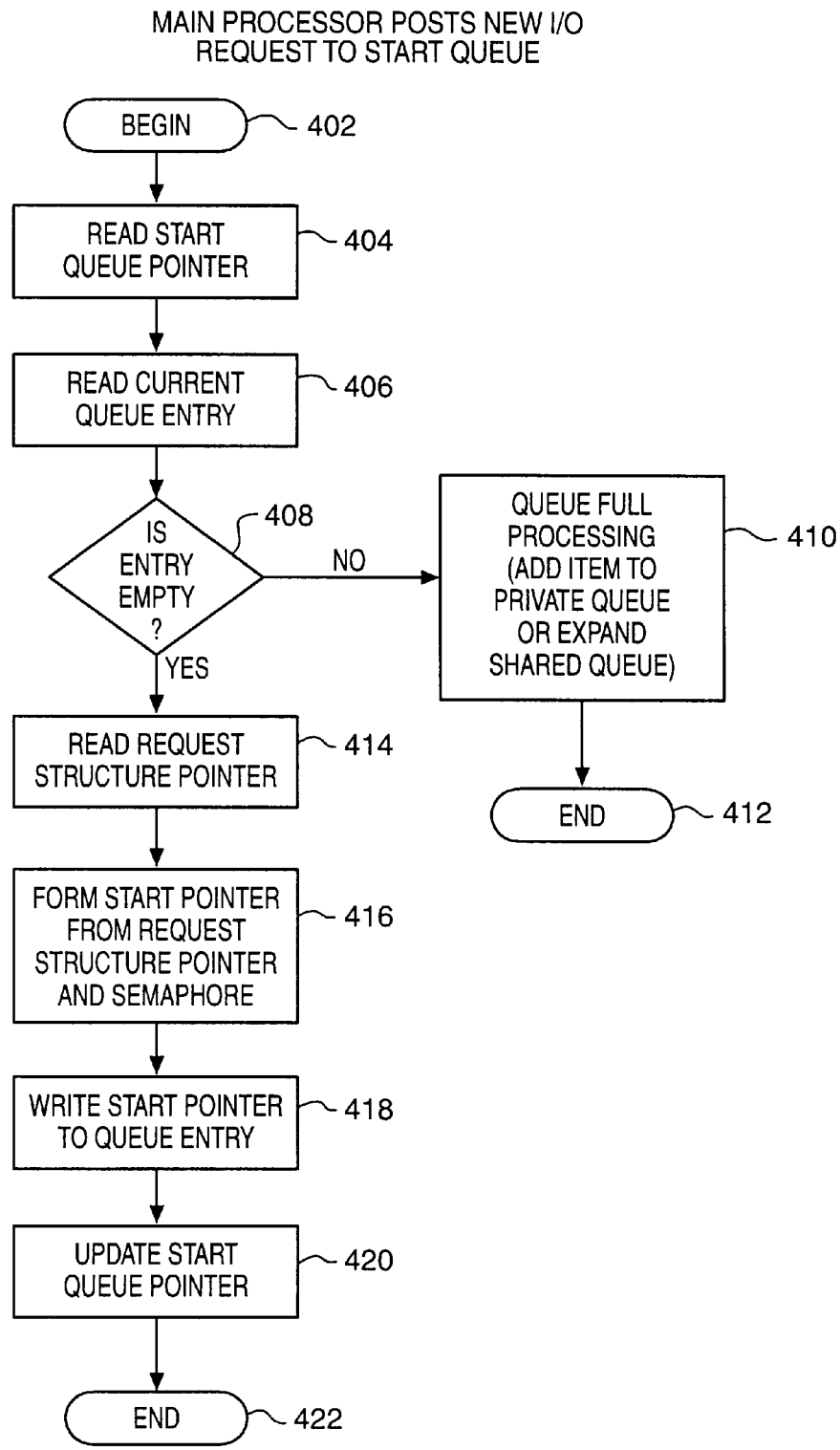
FIG. 4 is a high level flowchart for a process by which a main processor posts an I/O request to the start queue of an embedded processor in accordance with the invention.

Referring to FIG. 4, a high level flowchart for a process by which a main processor posts an I/O request to the start queue of an embedded processor in accordance with the invention is portrayed. The process begins at step 402 with a main processor initiating an attempt to write to a shared queue entry and proceeds to step 404, which depicts the main processor reading the start queue write pointer. The process next passes to step 406, which illustrates the main processor reading the current queue entry identified by the start queue write pointer, and then to step 408, which depicts a determination by the main processor of whether the current queue entry is empty. If the current queue entry is not empty, the process proceeds to step 410, which illustrates execution of the main processor's queue full processing algorithm. If the start queue is static, the main processor may add the item to a private queue to defer entry into the shared queue until a later time. If the start queue is dynamic, the main processor may initiate an expansion of the shared start queue. In either event, the process passes to step 412, which depicts the end of the process when the current start queue entry is full. The process must be restarted to post the request to a start queue entry.

Referring back to step 408, if the current queue entry is empty, the process passes instead sequentially: to step 414, which illustrates the main processor reading the request structure pointer; then to step 416, which depicts the formation of the start pointer by the main processor from the request structure pointer and the semaphore indicating ownership of the queue entry by the sub-processor; to step 418, which illustrates the main processor writing the start pointer to the current queue entry. At this point in the process, the main processor may signal the sub-processor that the entry has been posted through the optional hardware described above. The process then passes to step 420, which depicts the main processor updating the start queue write pointer. The process passes next to step 422, which illustrates the process, with the request successfully posted to the start queue.

Figure 5:
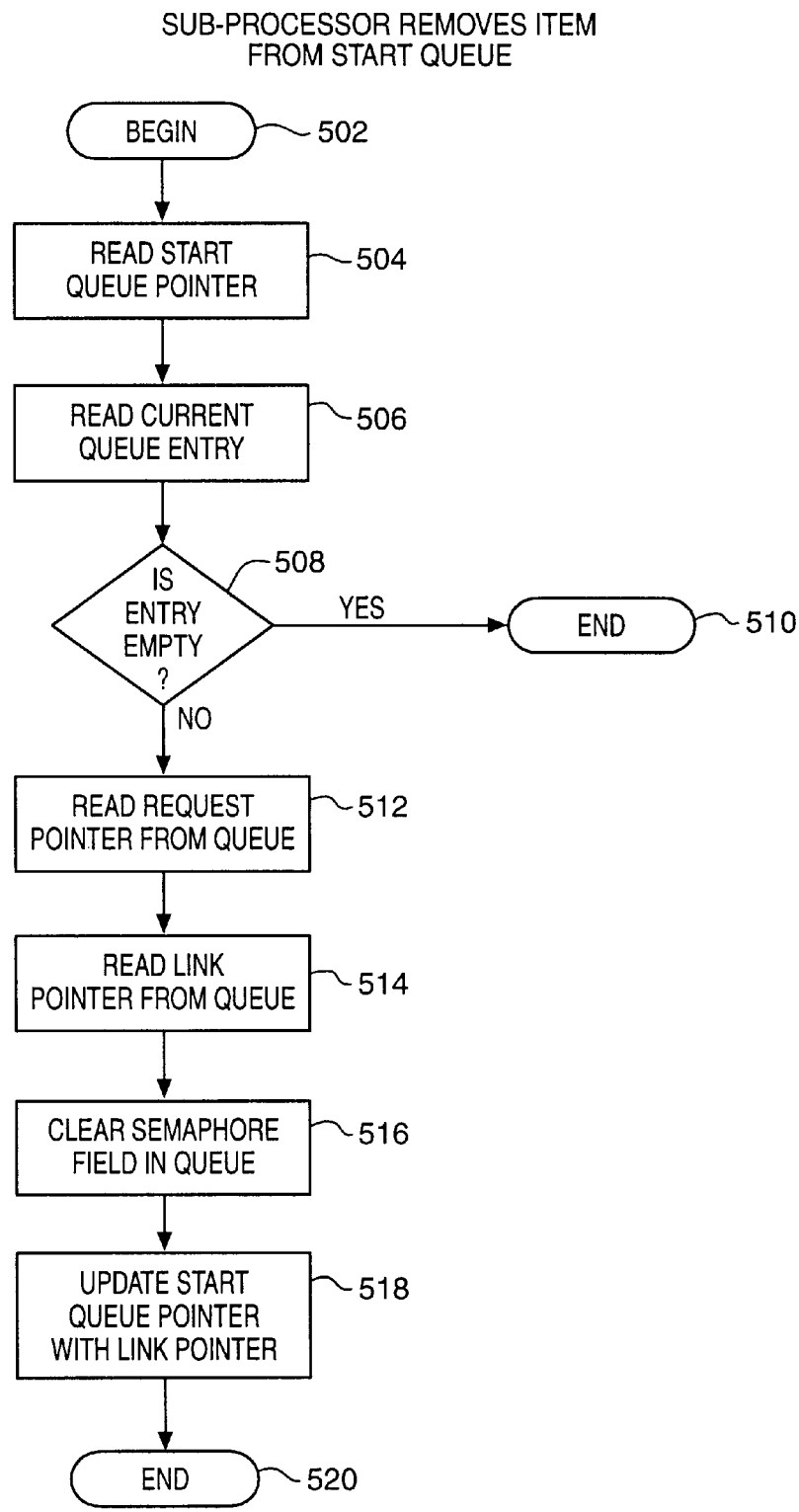
FIG. 5 depicts a high level flowchart for a process by which a sub-processor removes an item from the start queue of the sub-processor in accordance with the invention.

With reference now to FIG. 5, a high level flowchart for a process by which a sub-processor removes an item from the start queue of the sub-processor in accordance with the invention is depicted. The process begins at step 502, which depicts the sub-processor initiating a read of an I/O request from the start queue, which may be in response to completion of a previous I/O request or a signal indicating that a request has been posted. The process passes to step 504, which illustrates the sub-processor reading the start queue read pointer, and then to step 506, which depicts the sub-processor reading the current start queue entry. The process next passes to step 508, which illustrates a determination by the sub-processor of whether the current start queue entry is empty. If so, the process proceeds to step 510, which illustrates the end of the process as there are no requests for the sub-processor to process.

If the current queue entry is not empty, the process passes instead to step 512, which depicts the sub-processor reading the request pointer from the start queue. The process next passes to step 514, which illustrates the sub-processor reading the link pointer from the current queue entry; then to step 516, which depicts the sub-processor clearing the semaphore field in the queue entry; and then to step 518, which illustrates the sub-processor updating the start queue read pointer with the link pointer. The process next passes to step 520, which depicts the end of the process, with the request successfully retrieved from the start queue for processing by the sub-processor.

Figure 6:
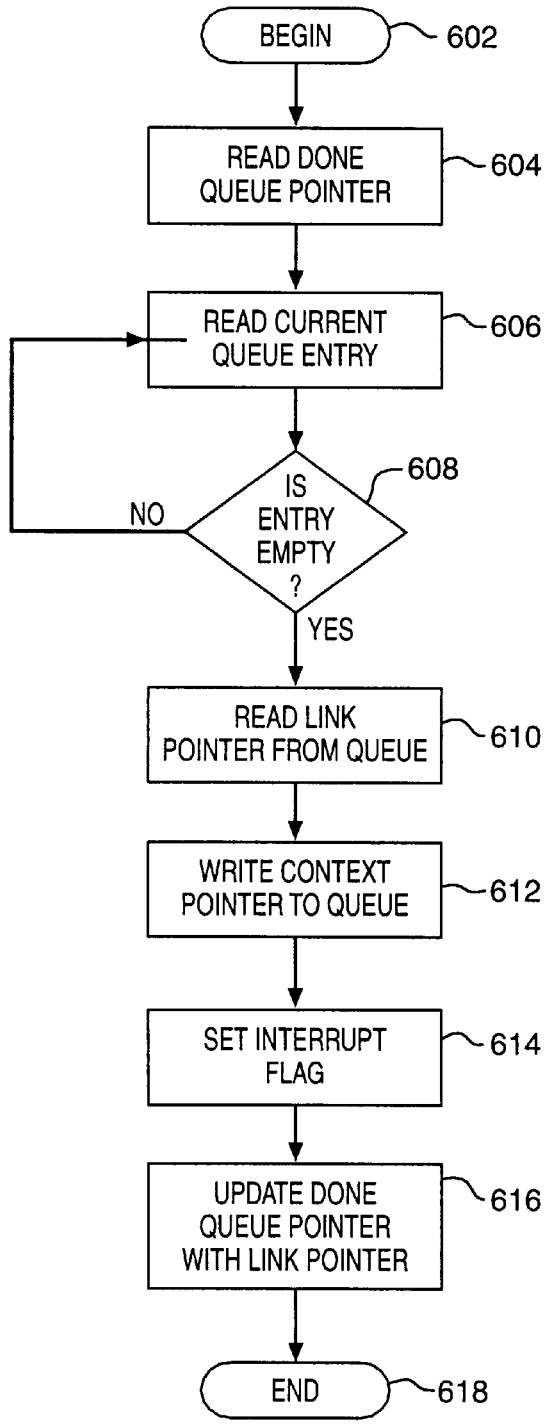
FIG. 6 is a high level flowchart for a process by which a sub-processor posts completed I/O requests to a completion queue for the sub-processor in accordance with the invention.

Referring to FIG. 6, a high level flowchart for a process by which a sub-processor posts completed I/O requests to a completion queue for the sub-processor in accordance with the invention is portrayed. The process begins at step 602, which illustrates a sub-processor initiating a post of completion data to a done queue in response to completing the I/O request. The process passes to step 604, which depicts the sub-processor reading the done queue write pointer, and then to step 606, which illustrates the sub-processor reading the current queue entry of the done queue. The process next passes to step 608, which illustrates a determination by the sub-processor of whether the current queue entry is empty based on the semaphore field. If the current queue entry is not empty, the process passes back to step 606. The sub-processor continues polling the current queue entry until it becomes empty, indicating the completion data within that queue entry has been read by a main processor.

Once the current queue entry is empty, the process proceeds from step 608 on to step 610, which depicts the sub-processor reading the link pointer from the current queue entry. The process then passes to step 612, which illustrates the sub-processor writing the context pointer to the current queue entry; then to step 614, which depicts the sub-processor setting an interrupt flag to alert a main processor of the presence of completion data in the done queue; and then to step 616, which illustrates the sub-processor updating the done queue write pointer with the link pointer. The process then passes to step 618, which depicts the end of the process, with completion data successfully written to the done queue by the sub-processor.

Figure 7:
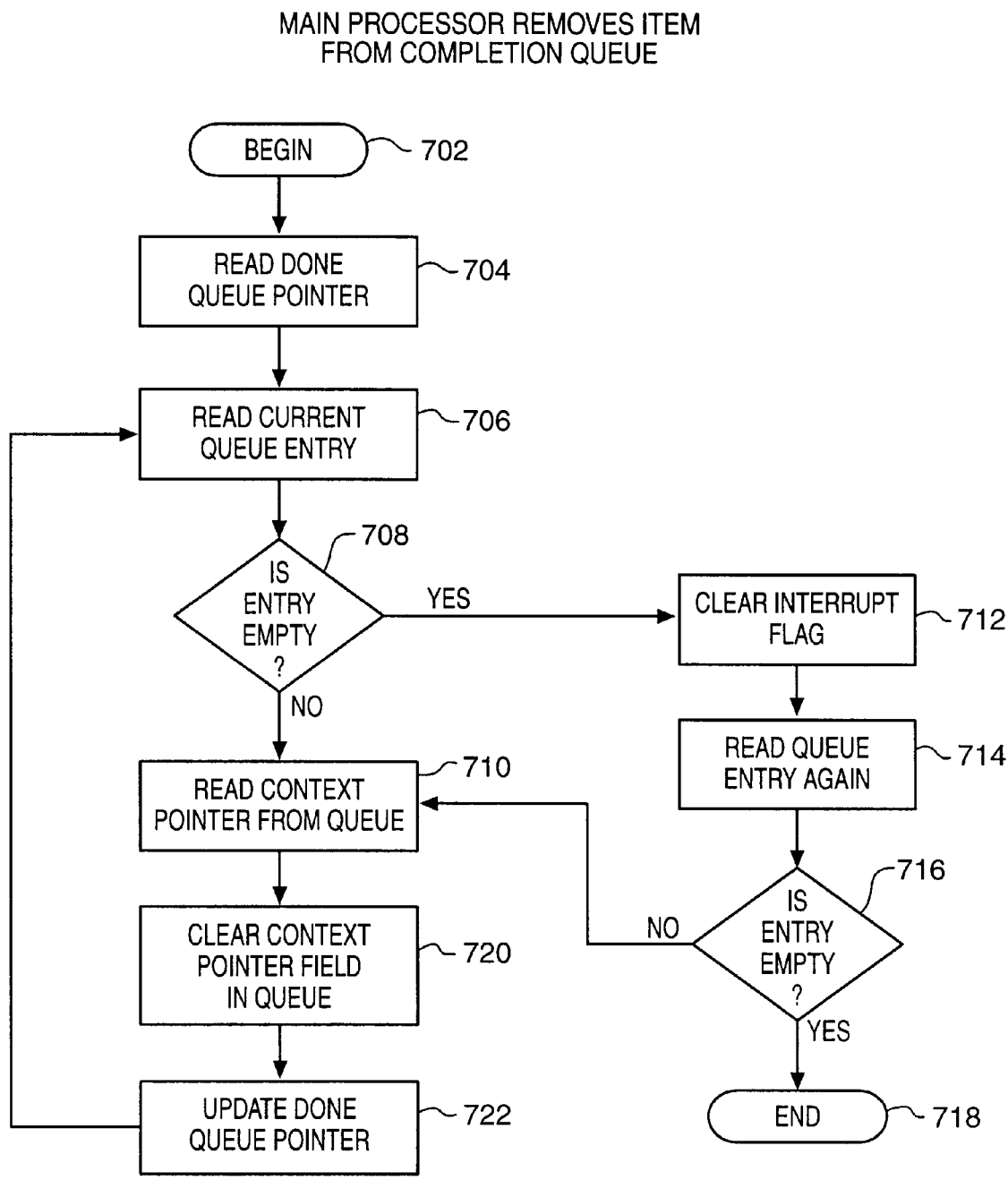
FIG. 7 depicts a high level flowchart for a process by which a main processor removes an item from the completion queue of a sub-processor in accordance with the invention.

With reference now to FIG. 7, a high level flowchart for a process by which a main processor removes an item from the completion queue of a sub-processor in accordance with the invention is depicted. The process begins at step 702, which illustrates the beginning of the process, with a main processor initiating a read of completion data from the done queue of a sub-processor in response to an interrupt. The process next passes to step 704, which illustrates the main processor reading the done queue read pointer, and then to step 706, which depicts the main processor reading the current queue entry from the done queue. The process then passes to step 708, which illustrates a determination by the main processor of whether the current queue entry is empty. If not the process, proceeds to step 710, which is described below.

If the current queue entry is empty, however, the process proceeds instead to step 712, which depicts the main processor clearing the interrupt flag set by the sub-processor. The process next passes to step 714, which depicts the main processor reading the current queue entry again, and then to step 716, which depicts the main processor again determining if the current queue entry is empty. If the current queue entry is now empty, the process proceeds to step 718, which depicts the end of the process, with the main processor having successfully cleared an entry or entries from the completion queue.

If the current queue entry is now found not to be empty by the main processor, which may occur if an entry was posted to the completion queue by the sub-processor while the main processor cleared the interrupt flag, the process passes back to step 710, which illustrates the main processor reading the context pointer from the current queue entry. The process passes next to step 720, which depicts the main processor clearing the context pointer field in the queue entry, and then to step 722, which illustrates the main processor updating the done queue read pointer with the link pointer. The process then passes back to step 706, which depicts the process again reading the current queue entry. By looping through the process depicted in steps 706, 708, 710, 720, and 722, the main processor may progress through all done queue entries containing completion information without interruption.

The preferred embodiment of the present invention employs hardware for signalling between the main processor and the sub-processor. As described above, however, polling of the start and completion queues be employed in lieu of such hardware. Thus the invention may be implemented entirely in software.

The present invention eliminates the requirement of a locking mechanism and improves overall I/O performance by removing the latency associated with the lock mechanism. Items may be posted to and cleared from shared queues without requiring a locking mechanism for mutual exclusion. The main processor may post items to the start queue and clear items from the completion queue independent of the state of the sub-processor. Similarly, the sub-processor may post items to the completion queue and clear items from the start queue without regard to the state of the main processor. I/O queuing is thus simplified while I/O data rates, which are themselves increased, no longer constrain main processor speeds.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A queue control mechanism in a multiprocessor data processing system including a main processor and a sub-processor, comprising:
   a shared queue comprising a plurality of entries, the shared queue being dynamically expandable;
   a semaphore associated with an entry within the plurality of entries, wherein a state of the semaphore reflects ownership of the entry; and
   a processor selected form the group consisting of the main processor and the sub-processor, the processor being capable of posting to the entry only if the state of the semaphore indicates that the entry is owned by the processor, wherein the integrity of the shared queue is preserved without a locking mechanism.

2. The mechanism of claim 1 wherein the shared queue is uniquely associated with the sub-processor.

3. The mechanism of claim 1 wherein the shared queue is a start queue for I/O requests.

4. The mechanism of claim 1 wherein the shared queue is a completion queue for I/O requests.

5. The mechanism of claim 1 wherein the processor changes the state of the semaphore after posting to the entry to indicate that the entry is no longer owned by the processor.

6. The mechanism of claim 1 wherein the processor comprises a first processor, the mechanism further comprising:
   a second processor selected from the group consisting of the main processor and the sub-processor,
   wherein the first processor changes the state of the semaphore after posting to the entry to indicate that the entry is owned by the second processor and signals the second processor, and
   the second processor changes the state of the semaphore after reading the entry to indicate that the entry is owned by the first processor.

7. The mechanism of claim 6 wherein the first processor is the main processor and second processor is the sub-processor.

8. The mechanism of claim 6 wherein the first processor is the sub-processor and second processor is the main processor.

9. A data processing system, comprising:
   a first processor;
   a second processor processing I/O requests for the first processor; and
   a shared memory containing a shared queue comprising a plurality of queue entries, the shared queue being dynamically expandable, each queue entry within the plurality of queue entries having an associated flag wherein a first state of the flag indicates ownership of the queue entry by the first processor and a second state of the flag indicates ownership of the queue entry by the second processor,
   wherein the first processor is capable of posting to a queue entry only if a flag associated with the queue entry is in the first state.

10. The data processing system of claim 9 wherein the second processor is capable of posting to a queue entry only if a flag associated with the queue entry is in the second state.

11. The data processing system of claim 9 wherein the first processor changes a state of a flag associated with a queue entry from the first state to the second state after posting to the queue entry.

12. The data processing system of claim 11 wherein the second processor changes the state of the flag associated with the queue entry from the second state to the first state after clearing the queue entry.

13. A queue control mechanism in a multiprocessor data processing system, comprising:
   a shared queue which is dynamically expandable;
   a semaphore associated with a shared queue entry, a state of the semaphore reflecting ownership of the entry by a processor within a plurality of processors; and
   a processor posting to the entry only if the entry is owned by the processor.

14. The queue control mechanism of claim 13 wherein a first state of the semaphore indicates that the shared queue entry is empty and a second state of the semaphore indicates that the shared queue entry is not empty.

15. The queue control mechanism of claim 14 wherein the processor posts to the shared queue entry only if the shared queue entry is empty.

16. The queue control mechanism of claim 14 wherein the processor creates a new shared queue entry if the shared queue entry is not empty.

17. A driver for a processor employing a shared queue including a plurality of queue entries in a multiprocessor data processor, each queue entry in the plurality of queue entries having an associated semaphore indicating ownership of the queue entry by a processor, comprising:
   instructions for determining whether a current queue entry is owned by the processor;

instructions, responsive to determining that the current queue is owned by the processor, for operating on the current queue entry; and instructions for dynamically expanding the shared queue.

18. The driver of claim 17 wherein the instructions for determining whether a current queue entry is owned by the processor further comprise:

instructions for reading the current queue entry; and instructions for determining if the current queue entry is empty.

19. The driver of claim 17 wherein the instructions for operating on the current queue entry further comprise instructions for posting to the current queue entry.

20. The driver of claim 19 wherein the instructions for posting to the current queue entry further comprise instructions for posting an I/O request.

21. The driver of claim 19 wherein the instructions for posting to the current queue entry further comprise instructions for posting completion data for an I/O request.

22. The driver of claim 19, further comprising:

instructions for signaling that a queue entry has been posted.

23. The driver of claim 17 wherein the instructions for operating on the current queue entry further comprise instructions for clearing the current queue entry.

24. The driver of claim 17, further comprising:

instructions, responsive to determining that the queue is not owned by the processor, for creating an additional queue entry.

25. The driver of claim 17, further comprising:

instructions, responsive to determining that the queue is not owned by the processor, for posting to a private queue.

26. A method of controlling a shared queue in a multi-processor data processing system, comprising:

associating a variable with an entry in the shared queue, the shared queue being dynamically expandable, the variable having a first state indicating ownership of the entry by a first class of processors and a second state indicating ownership of the entry by a second class of processors;

responsive to a processor within the first class of processors attempting to operate on the entry, determining the state of the variable; and responsive to determining that the state of the variable is the first state, permitting the processor to operate on the entry.

27. The method of claim 26 wherein the step of associating a variable with an entry in the shared queue further comprises setting the state of the variable to the first state if the entry is empty and setting the state of the variable to the second state if the entry is not empty.

28. The method of claim 26 further comprising:

responsive to determining that the state of the variable is the second state, creating a new entry in the shared queue.

29. The method of claim 26 wherein the step of permitting the processor to operate on the entry further comprises permitting the processor to post an I/O request to the entry.

30. The method of claim 26 wherein the step of permitting the processor to operate on the entry further comprises permitting the processor to post completion data for an I/O request to the entry.

31. A queue control mechanism in a multiprocessor data processing system including a main processor and a sub-processor, comprising:

a shared queue comprising a plurality of entries;

a semaphore associated with an entry within the plurality of entries, wherein a state of the semaphore reflects ownership of the entry; and a first processor selected from the group consisting of the main processor and the sub-processor, the first processor being capable of posting to the entry only if the state of the semaphore indicates that the entry is owned by the first processor, wherein the integrity of the shared queue is preserved without a locking mechanism;

a second processor selected from the group consisting of the main processor and the sub-processor, wherein the first processor changes the state of the semaphore after posting to the entry to indicate that the entry is owned by the second processor and signals the second processor, and the second processor changes the state of the semaphore after reading the entry to indicate that the entry is owned by the first processor.

* * * * *